US009128335B2

United States Patent
Sakai

(10) Patent No.: US 9,128,335 B2
(45) Date of Patent: Sep. 8, 2015

(54) LIQUID CRYSTAL PANEL, LIQUID CRYSTAL DISPLAY DEVICE

(75) Inventor: Tamotsu Sakai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 32 days.

(21) Appl. No.: 14/113,286

(22) PCT Filed: May 17, 2012

(86) PCT No.: PCT/JP2012/062703
§ 371 (c)(1),
(2), (4) Date: Oct. 22, 2013

(87) PCT Pub. No.: WO2012/157720
PCT Pub. Date: Nov. 22, 2012

(65) Prior Publication Data
US 2014/0049711 A1    Feb. 20, 2014

(30) Foreign Application Priority Data
May 18, 2011    (JP) .................................. 2011-111911

(51) Int. Cl.
*G02F 1/1345*    (2006.01)
*G02F 1/1343*    (2006.01)
(52) U.S. Cl.
CPC ........ *G02F 1/134309* (2013.01); *G02F 1/1345* (2013.01); *G02F 1/13458* (2013.01)
(58) Field of Classification Search
USPC .................................................. 349/149–152
See application file for complete search history.

(56) References Cited

U.S. PATENT DOCUMENTS

| 6,774,973 | B2 * | 8/2004 | Ko ................................ 349/153 |
| 7,009,202 | B2 * | 3/2006 | Jang et al. ........................ 257/59 |
| 8,138,792 | B2 * | 3/2012 | Chang et al. ..................... 326/47 |
| 2006/0077144 | A1 * | 4/2006 | Eom et al. ........................ 345/82 |
| 2010/0149412 | A1 | 6/2010 | Yamashita |

FOREIGN PATENT DOCUMENTS

JP    2009-130639 A    6/2009

OTHER PUBLICATIONS

Official Communication issued in International Patent Application No. PCT/JP2012/062703, mailed on Jul. 24, 2012.

* cited by examiner

*Primary Examiner* — Hoan C Nguyen
(74) *Attorney, Agent, or Firm* — Keating & Bennett, LLP

(57) ABSTRACT

The present liquid crystal panel includes an array substrate including a pixel electrode, a transistor, and first and second data signal lines; and a counter, the array substrate includes first and second sides which are adjacent to each other, a first terminal having shorter distance from the first side than distance from the second side in a plan view, and a second terminal having shorter distance from the second side than distance from the first side in a plan view are formed in the array substrate, the first data signal line is electrically connected to the first terminal, the second data signal line and the second terminal are electrically connected via a relay wiring formed in a layer different from the first and second data signal lines. According to the above configuration, the number of terminals for data signal lines can be increased without changing the size of the liquid crystal panel.

9 Claims, 18 Drawing Sheets

LIQUID CRYSTAL PANEL, LIQUID CRYSTAL DISPLAY DEVICE

TECHNICAL FIELD

The present invention relates to a liquid crystal panel used for a liquid crystal display device.

BACKGROUND ART

The number of pixels of the current high definition television broadcast (High Definition television: so-called full HD) is horizontally 1920×vertically 1080 (so-called 2K1K), but video standards regarding the number of pixels four times (so-called 4K2K) or 16 times (so-called 8K4K, Super Hi-Vision SHV is also one kind of such) full HD have been proposed.

CITATION LIST

Patent Literature

PTL 1: Japanese Unexamined Patent Application Publication No. 2009-130639 (disclosed on Jun. 11, 2009)

SUMMARY OF INVENTION

Technical Problem

Along with such higher definition of video, with liquid crystal panels, the number of terminals (input terminals) for data signal lines has markedly been increased, and a conventional configuration wherein the terminals for data signal lines are arrayed along one side (a side along a direction orthogonal to a direction in which a data signal line extends) of a liquid crystal panel has a problem in that a necessary number of input terminals will eventually not be able to be arrayed.

One object of the present invention is to increase the number of terminals for data signal lines without changing the size of a liquid crystal panel.

Solution to Problem

The present liquid crystal panel is a liquid crystal including: an array substrate (active matrix substrate) including a pixel electrode, a transistor, and first and second data signal lines; and a counter substrate; with the array substrate including first and second sides which are adjacent to each other; with a first terminal having shorter distance from the first side than distance from the second side in a plan view, and a second terminal having shorter distance from the second side than distance from the first side in a plan view being formed in the array substrate; with the first data signal line being electrically connected to the first terminal; and with the second data signal line and the second terminal being electrically connected via a relay wiring formed in a layer different from the first and second data signal lines.

In this manner, a terminal (second terminal) is also formed on the second side, and this second terminal and the second data signal line are connected via the relay wiring of a layer different from the first and second data signal lines, whereby the number of terminals for data signal lines can be increased without changing a substrate size.

Advantageous Effects of Invention

According to the present liquid crystal panel, the number of terminals for data signal lines can be increased without changing a substrate size.

DESCRIPTION OF EMBODIMENTS

First Embodiment

Figure 4:
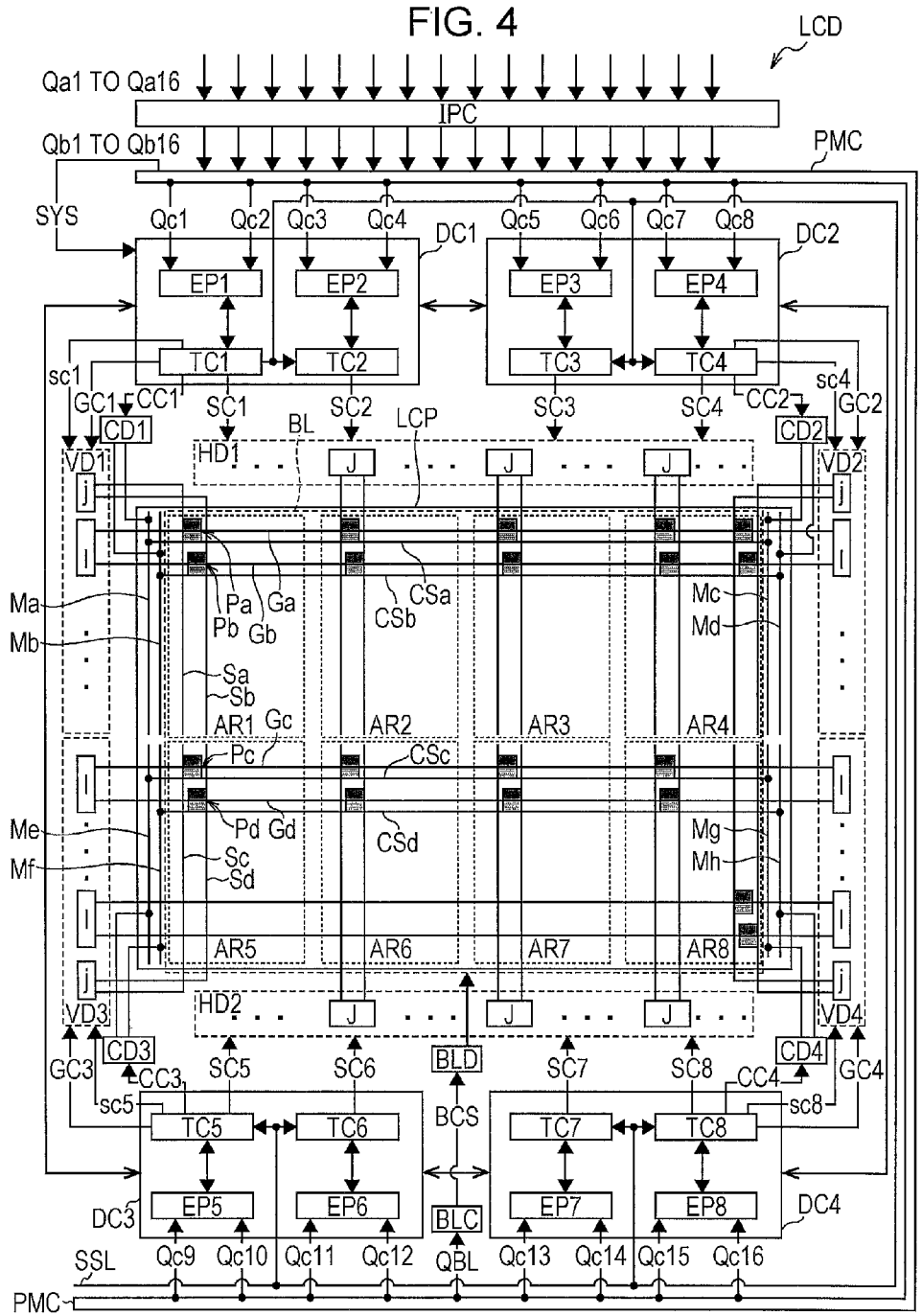
FIG. 4 is a schematic view illustrating a configuration of a liquid crystal display device according to the first embodiment.

A liquid crystal display device LCD according to the present embodiment conforms to video standards having the number of pixels 16 times (8K4K) the number of full HD pixels (e.g., Super Hi-Vision of horizontal 1920 pixels×vertical 1080 pixels), and includes, as illustrated in FIG. 4, an input processing circuit IPC, a pixel mapping circuit PMC, four display control substrates (timing controller substrates) DC1 to DC4, a liquid crystal panel LCP, four vertical drivers VD1 to VD4, two horizontal drivers HD1 to HD2, four CS drivers CD1 to CD4, three power units each of which is connected to a different commercial power source (not illustrated), a power supply controller (not illustrated), a backlight BL, a backlight driver BLD, and a backlight controller BLC.

Video signals to be input to the input processing circuit IPC may be video signals having the number of 8K4K pixels in a block scan format (e.g., Super Hi-Vision), or may be video signals having the number of 8K4K pixels in a multi-display format. It goes without saying that the video signals may be video signals having the number of 4K2K pixels, or may be video signals having the number of 2K1K pixels (the number of full HD pixels).

The block scan format is a format to be transmitted by dividing one frame (whole image having the number of 8K4K pixels) into 16 rough-textured whole images (having the number of full HD pixels) (so-called thinned-out images). In this case, each of 16 video signals Qa1 to Qa16 to be input to the input processing circuit IPC makes up a rough-textured whole image (the number of full HD pixels).

The multi-display format is a format to be transmitted by dividing one frame (whole image having the number of 8K4K pixels) into 16 divisions as 16 partial images without changing fineness in texture. In this case, each of the 16 video signals Qa1 to Qa16 to be input to the input processing circuit IPC makes up a fine-textured partial image (the number of full HD pixels).

The input processing circuit IPC performs video data synchronizing processing, gamma correction processing, color temperature correction processing, color-gamut-conversion processing, or the like, and outputs video signals Qb1 to Qb16 to the pixel mapping circuit PMC.

Here, the display control substrate DC1 includes two video processing circuits EP1 and EP2 and two timing controllers TC1 and TC2, the display control substrate DC2 includes two video processing circuits EP3 and EP4 and two timing controllers TC3 and TC4, the display control substrate DC3 includes two video processing circuits EP5 and EP6 and two timing controllers TC5 and TC6, and the display control substrate DC4 includes two video processing circuits EP7 and EP8 and two timing controllers TC7 and TC8.

The pixel mapping circuit PMC divides a video signal (the number of 2K2K pixels) corresponding to a left half AR1 of a local area 1 (upper left region when diving the liquid crystal LCP into four divisions from side to side and up and down) into two (video signals Qc1 and Qc2 of the number of full HD pixels), outputs to the video processing circuit EP1 of the display control substrate DC1, divides a video signal (the number of 2K2K pixels) corresponding to a right half AR2 of the local area 1 into two (video signals Qc3 and Qc4 of the number of full HD pixels), outputs to the video processing circuit EP2 of the display control substrate DC1, divides a video signal (the number of 2K2K pixels) corresponding to a left half AR3 of a local area 2 (upper right region when diving the liquid crystal panel LCP into four divisions from side to side and up and down) into two (video signals Qc5 and Qc6 of the number of full HD pixels), outputs to the video processing circuit EP3 of the display control substrate DC2, divides a video signal (the number of 2K2K pixels) corresponding to a right half AR4 of the local area 2 into two (video signals Qc7 and Qc8 of the number of full HD pixels), outputs to the video processing circuit EP4 of the display control substrate DC2, divides a video signal (the number of 2K2K pixels) corresponding to a left half AR5 of a local area 3 (lower left region when diving the liquid crystal panel LCP into four divisions from side to side and up and down) into two (video signals Qc9 and Qc10 of the number of full HD pixels), outputs to the video processing circuit EP5 of the display control substrate DC3, divides a video signal (the number of 2K2K pixels) corresponding to a right half AR6 of the local area 3 into two (video signals Qc11 and Qc12 of the number of full HD pixels), outputs to the video processing circuit EP6 of the display control substrate DC3, divides a video signal (the number of 2K2K pixels) corresponding to a left half AR7 of a local area 4 (lower right region when diving the liquid crystal panel LCP into four divisions from side to side and up and down) into two (video signals Qc13 and Qc14 of the number of full HD pixels), outputs to the video processing circuit EP7 of the display control substrate DC4, divides a video signal (the number of 2K2K pixels) corresponding to a right half AR8 of the local area 4 into two (video signals Qc15 and Qc16 of the number of full HD pixels), and outputs to the video processing circuit EP8 of the display control substrate DC4.

Further, the pixel mapping circuit PMC outputs the synchronizing signals SYS (vertical synchronizing signal, horizontal synchronizing signal, clock signal, data enable signal, polarity inversion signal, and so forth) to the timing controller TC1 of the display control substrate DC1, the timing controller TC1 which has received these transmits these synchronizing signals SYS to inter-substrate shared lines SSL connected to the display control substrates DC1 to DC4.

The timing controller TC1 receives the synchronizing signals SYS from the pixel mapping circuit PMC, performs video processing such as gradation conversion processing and frame rate conversion (FRC) processing and so forth on the video signals Qc1 an Qc2 in cooperation with the video processing circuit EP1, then outputs a source control signal SC1 to a source driver substrate corresponding to the AR1, outputs a source control signal sc1 to a gate driver substrate corresponding to the AR1 (not illustrated), outputs a gate control signal GC1 to the gate driver substrate of the vertical driver VD1 (not illustrated), and outputs a CS control signal CC1 to the CS driver CD1.

The timing controller TC2 receives the synchronizing signals SYS transmitted from the timing controller TC1 via the inter-substrate shared lines SSL, performs the above video processing on the video signals Qc3 and Qc4 in cooperation with the video processing circuit EP2, and then outputs a source control signal SC2 to a source driver substrate corresponding to the AR2 (not illustrated).

The timing controller TC3 receives the synchronizing signals SYS transmitted from the timing controller TC1 via the inter-substrate shared lines SSL, performs the above video processing on the video signals Qc5 and Qc6 in cooperation with the video processing circuit EP3, and then outputs a source control signal SC3 to a source driver substrate corresponding to the AR3 (not illustrated).

The timing controller TC4 receives the synchronizing signals SYS transmitted from the timing controller TC1 via the inter-substrate shared lines SSL, performs the above video processing on the video signals Qc7 and Qc8 in cooperation with the video processing circuit EP4, and then outputs a source control signal SC4 to a source driver substrate corresponding to the AR4, outputs a source control signal sc4 to a gate driver substrate corresponding to the AR4 (not illustrated), outputs a gate control signal GC2 to the gate driver substrate of the vertical driver VD2 (not illustrated), and outputs a CS control signal CC2 to the CS driver CD2.

The timing controller TC5 receives the synchronizing signals SYS transmitted from the timing controller TC1 via the inter-substrate shared lines SSL, performs the above video processing on the video signals Qc9 and Qc10 in cooperation with the video processing circuit EP5, and then outputs a source control signal SC5 to a source driver substrate corresponding to the AR5, outputs a source control signal sc5 to a gate driver substrate corresponding to the AR5 (not illustrated), outputs a gate control signal GC3 to the gate driver substrate of the vertical driver VD3 (not illustrated), and outputs a CS control signal CC3 to the CS driver CD3.

The timing controller TC6 receives the synchronizing signals SYS transmitted from the timing controller TC1 via the inter-substrate shared lines SSL, performs the above video processing on the video signals Qc11 and Qc12 in cooperation with the video processing circuit EP6, and then outputs a source control signal SC6 to a source driver substrate corresponding to the AR6 (not illustrated).

The timing controller TC7 receives the synchronizing signals SYS transmitted from the timing controller TC1 via the inter-substrate shared lines SSL, performs the above video processing on the video signals Qc13 and Qc14 in cooperation with the video processing circuit EP7, and then outputs a source control signal SC7 to a source driver substrate corresponding to the AR7 (not illustrated).

The timing controller TC8 receives the synchronizing signals SYS transmitted from the timing controller TC1 via the inter-substrate shared lines SSL, performs the above video processing on the video signals Qc15 and Qc16 in cooperation with the video processing circuit EP8, and then outputs a source control signal SC8 to a source driver substrate corresponding to the AR8, outputs a source control signal sc8 to a gate driver substrate corresponding to the AR8 (not illustrated), outputs a gate control signal GC4 to the gate driver substrate of the vertical driver VD4 (not illustrated), and outputs a CS control signal CC4 to the CS driver CD4.

Note that, included in the source control signals SC1 to SC8 are data signals, a data enable signal (DE signal), a source start pulse, and a source clock, and included in the gate control signals GC1 to GC4 are an initial signal, a gate start pulse, and a gate clock.

Here, the above gradation conversion processing may include gradation correction processing according to a pixel position (a position in the column direction) for corresponding to a combination between high-speed display processing (QS processing) or panel vertical dividing driving (which will be described below) and 1V inversion driving of a data lines (which will be described below).

Also, with the above FRC processing, the video processing circuits may obtain a motion vector using any one of the 16 video signals Qa1 to Qa16 (a rough-textured whole image having the number of full HD pixels), and also generate a partial image for insertion (the number of full HD pixels) using the corresponding one of the video signals Qc1 to Qc16 (a fine-textured partial image having the number of full HD pixels).

Also, when employing an HDMI (high-definition multimedia interface) with 12-bit transfer as to input of the video signals Qc1 to Qc16, an error may occur wherein the DE signal (1920 lines worth) extends one clock forward (one line worth) and becomes 1921 lines worth, and accordingly, error correction processing may be performed wherein the width of the DE signal is monitored, and when the width of the DE signal becomes 1921 lines worth, the DE signal is raised with one clock delay. Specifically, with the display control substrate DC1 to which a data signal (e.g., video signals Qc1 to Qc4) and an effective signal (DE) indicating an effective period of this data signal are input via an input interface (e.g., HDMI), there are provided a detecting unit configured to detect at least one of contents of a data signal obtained based on the above effective period, and an active period of the above effective signal, and a correction unit configured to correct phase deviation of the above effective signal according to a detection result of the detecting unit. Thus, a defect of a data signal due to phase deviation of the effective signal (in particular, a defect that readily occurs when employing an HDMI) can be cancelled out.

The display control substrates DC1 to DC4 synchronize mutual operation by exchanging or sharing various signals between substrates. Specifically, the display control substrate DC1 which is a master transmits a RDY (preparation completion) signal to the display control substrate DC2 which is a slave. The display control substrate DC2 which has received this transmits a RDY signal to the display control substrate DC3 which is a slave as soon as preparation has been completed, the display control substrate DC3 which has received this transmits a RDY signal to the display control substrate DC4 which is a slave as soon as preparation has been completed, and the display control substrate DC4 which has received this returns a RDY signal to the display control substrate DC1 as soon as preparation has been completed. The display control substrate DC1 transmits, in response to a RDY signal being returned, an operation start (SRST) signal to the display control substrates DC2 to DC4 via the inter-substrate shared lines SSL all at once. After transmission of the operation start (SRST) signal, the timing controller TC1 of the display control substrate DC1 transmits the above synchronizing signals SYS received from the pixel mapping circuit PMC to the timing controllers TC2 to TC8 via the inter-substrate shared lines SSL all at once.

Also, in the event that, while the display control substrates DC1 to DC4 are operating, abnormality of display control has occurred on one of the display control substrates, a fail-safe signal transmitted from the display control substrate where abnormality has occurred is transmitted (cyclically transmitted or simultaneously transmitted via a shared line) to the other all display control substrates, and all of the control display substrates instantly go into a self-propelled state (black display) mode. Thus, video breakdown is avoided.

Also, various types of driving power supply is individually generated at each of the display control substrates DC1 to DC4, and lines where the same type (same potential and same phase) of power supply is supplied are connected between display control substrates via a current limiting circuit. Thus, overcurrent can be prevented from flowing into various drivers or display control substrates due to rising timing deviation between substrates or the like while realizing adjustment of the same type of driving power supply.

The liquid crystal panel LCP includes an active matrix substrate, a liquid crystal layer (not illustrated), and an opposing substrate (not illustrated). Provided to the active matrix substrate are multiple pixel electrodes (not illustrated), multiple TFTs (thin-film transistors, not illustrated), scanning signal lines Ga to Gd extending in the row direction (direction along the long side of the panel), multiple data signal lines Sa to Sd extending in the column direction, holding capacity wiring (CS wiring) CSa to CSd extending in the row direction, and CS trunk wirings Ma to Mh extending in the column direction, and provided to the opposing substrate are a common electrode (not illustrated), a color filter, and a black matrix (not illustrated).

The horizontal driver HD1 is provided along one long side included in an upper half of the liquid crystal panel LCP, and includes 38 source driver chips J arrayed in the row direction (the number of output terminals of one source driver chip is 960). The vertical driver VD1 is provided along one of two short sides included in an upper half of the liquid crystal panel LCP, and includes five source driver chips j arrayed in the column direction on the long-side side (the number of output terminals of one source driver chip is 960) and multiple gate driver chips 1 arrayed in the column direction. The vertical driver VD2 is provided along the other of the two short sides included in an upper half of the liquid crystal panel LCP, and includes five source driver chips j arrayed in the column direction on the long-side side (the number of output terminals of one source driver chip is 960) and multiple gate driver chips 1 arrayed in the column direction.

The data signal lines Sa and Sb are driven by the source driver chip j of the vertical driver VD1, and the scanning signal lines Ga and Gb are driven by a gate driver chip 1 of the vertical driver VD1 and a gate driver chip 1 of the vertical driver VD2.

Also, the horizontal driver HD2 is provided along one long side included in a lower half of the liquid crystal panel LCP, and includes 38 source driver chips J arrayed in the row direction (the number of output terminals of one source driver chip is 960). The vertical driver VD3 is provided along one of two short sides included in a lower half of the liquid crystal panel LCP, and includes five source driver chips j arrayed in the column direction on the long-side side (the number of output terminals of one source driver chip is 960) and multiple gate driver chips 1 arrayed in the column direction. The vertical driver VD4 is provided along the other of the two short sides included in a lower half of the liquid crystal panel LCP, and includes five source driver chips j arrayed in the column direction on the long-side side (the number of output terminals of one source driver chip is 960) and multiple gate driver chips 1 arrayed in the column direction.

The data signal lines Sc and Sd are driven by the source driver chip j of the vertical driver VD3, and the scanning signal lines Gc and Gd are driven by a gate driver chip 1 of the vertical driver VD3 and a gate driver chip 1 of the vertical driver VD4.

In this manner, one scanning signal line is connected to two vertical drivers disposed on both sides thereof, and a scanning (pulse) signal having the same phase is supplied to this one scanning signal line from these two vertical drivers. Thus, irregularities in signal deterioration due to CR (time constant) of a scanning signal line (change in degree of signal deterioration depending on position in the row direction) can be suppressed.

Note that a source driver chip j and gate driver chips 1 are arrayed in the column direction on the panel short-side side where there is space available, and accordingly, the number of implementable source driver chips (the number of source terminals) can be increased, and higher definition and high-speed driving of a liquid crystal display device can be handled. Note that, in this case, a relay wiring configured to connect a data signal line and a source terminal on the panel short-side side may be provided to the counter substrate side, or other than a source layer of the active matrix substrate (a formation layer of source and drain electrodes of a TFT), that is, a layer between a lower layer (gate layer), source layer, and ITO layer (pixel electrode formation layer) of a gate insulating film.

Figure 1:
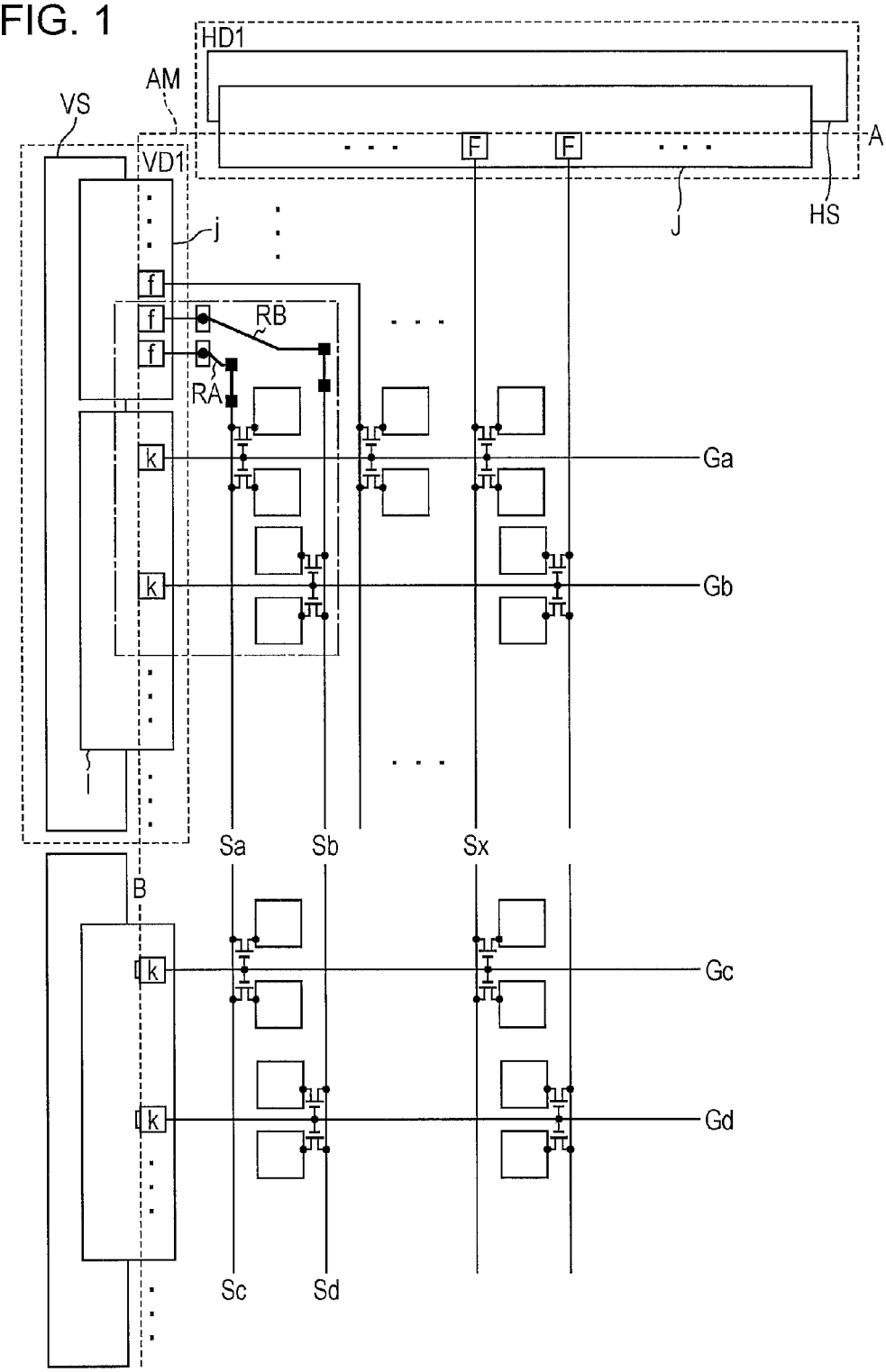
FIG. 1 is a schematic view illustrating a partial configuration of a liquid crystal panel according to a first embodiment.
Figure 2:
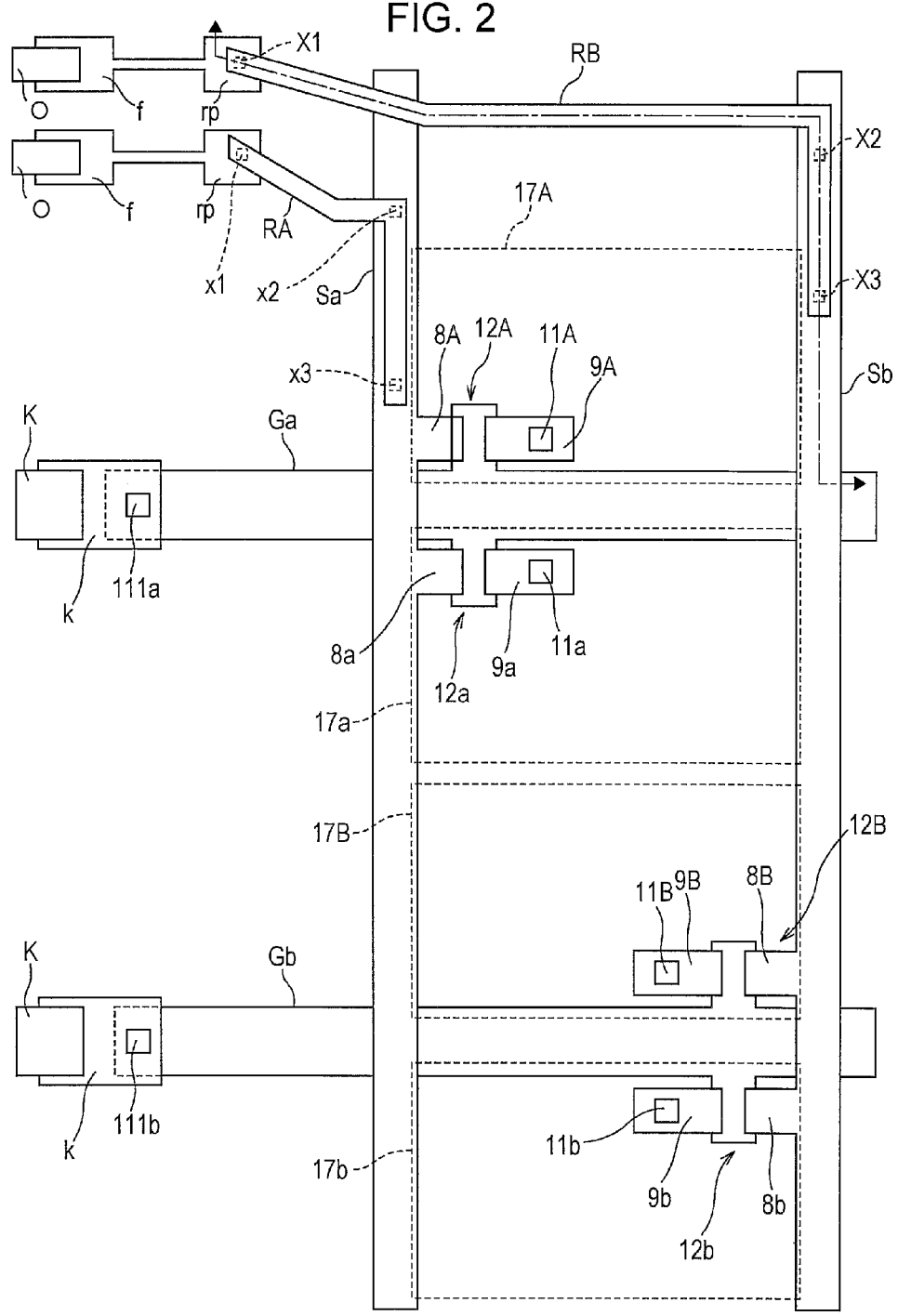
FIG. 2 is a plan view illustrating a configuration surrounded with a dashed line in FIG. 1.

Specifically, as illustrated in FIG. 1 and FIG. 2 which is a plan view of a portion surrounded with the dashed line in FIG. 1, an active matrix substrate AM of the liquid crystal panel LCP includes a long side A (a side orthogonal to the direction in which data signal lines extend) and a short side B (a side parallel to the direction in which data signal lines extend) which are adjacent to each other, wherein a source terminal F (first terminal) with shorter distance from the long side A than distance from the short side B in plan view, and a source terminal f (second terminal) with shorter distance from the short side B than distance from the long side A in plan view are formed, a data signal line Sx is connected to a source terminal F, the data signal line Sa is electrically connected to a source terminal f via a relay wiring RA formed on a layer different from the data signal lines Sx and Sa. Also, the data signal line Sb is connected to another source terminal f via a relay wiring RB formed on a layer different from the data signal lines Sx and Sb. Note that the source driver chip j is adhered to a vertical driver substrate VS, and an output terminal O and a source terminal f of the vertical driver substrate VS are in contact with each other.

With the active matrix substrate, as illustrated in FIG. 2, a portion of the scanning signal line Ga makes up a gate electrode of a transistor 12A, a source electrode 8A of the transistor 12A is connected to the data signal line Sa, and a drain electrode 9A of the transistor 12A is connected to a pixel electrode 17A via a contact hole 11A. Also, a portion of the scanning signal line Ga makes up a gate electrode of a transistor 12*a*, a source electrode 8*a* of the transistor 12*a* is connected to the data signal line Sa, and a drain electrode 9*a* of the transistor 12*a* is connected to a pixel electrode 17*a* via a contact hole 11*a*.

Also, a portion of the scanning signal line Gb makes up a gate electrode of a transistor 12B, a source electrode 8B of the transistor 12B is connected to the data signal line Sb, and a drain electrode 9B of the transistor 12B is connected to a pixel electrode 17B via a contact hole 11B. Also, a portion of the scanning signal line Gb makes up a gate electrode of a transistor 12*b*, a source electrode 8*b* of the transistor 12*b* is connected to the data signal line Sb, and a drain electrode 9*b* of the transistor 12*b* is connected to a pixel electrode 17*b* via a contact hole 11*b*.

The scanning signal line Ga is connected to a gate terminal k of a metal layer (data signal line formation layer) via a contact hole 111*a*, and an output terminal K and a gate terminal k of the vertical driver substrate VS are in contact with each other. Similarly, the scanning signal line Gb is connected to a gate terminal k of a metal layer (data signal line formation layer) via a contact hole 111*b*, and an output terminal K and a gate terminal k of the vertical driver substrate VS are in contact with each other.

Figure 3:
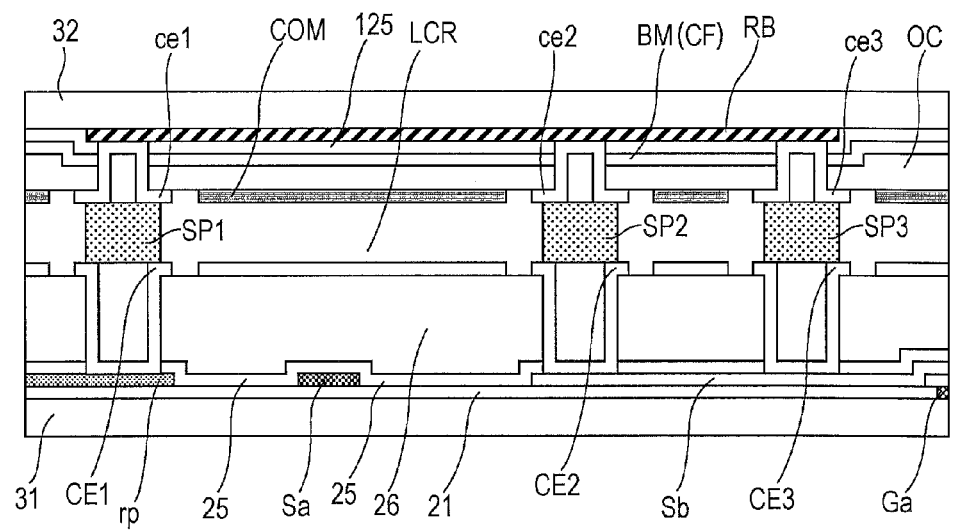
FIG. 3 is a cross-sectional view taken along the arrow in FIG. 2.

FIG. 3 illustrates a cross-sectional configuration of inter-substrate connection portions X1 to X3 in FIG. 2. As illustrated in FIG. 3, with the active matrix substrate, the scanning signal line Ga is formed on a glass substrate 31, a gate insulating film 21 is formed on the scanning signal line Ga, data signal lines Sa and Sb, and a relay pad rp are formed on the gate insulating film 21, an inorganic inter-layer insulating film 25 and an organic inter-layer insulating film 26 are laminated on an upper layer of these, and a transparent electrode formed in the same process as with each pixel electrode (e.g., ITO) and relay electrodes CE1 to CE3 are formed on the organic inter-layer insulating film 26.

With the counter substrate, a rely wiring RB is formed on a glass substrate 32, an inorganic inter-layer insulating film 125 is formed on the relay wiring RB, a black matrix BM is formed on the inorganic inter-layer insulating film 125, an overcoat film OC is formed on the black matrix BM, and a shared electrode COM and relay electrodes ce1 to ce3 are formed on the overcoat layer OC.

With the inter-substrate connection portion X1, the relay electrode CE1 and relay pad rp of the active matrix substrate are connected via a contact hole which passes through the inorganic inter-layer insulating film 25 and organic inter-layer insulating film 26, the relay electrode ce1 and relay wiring RB of the counter substrate are connected via a contact hole which passes through the inorganic inter-layer insulating film 125 and overcoat film OC, and the relay electrode CE1 and relay electrode ce1 are connected via an electroconductive spacer SP1 which passes through a liquid crystal layer.

Similarly, with the inter-substrate connection portion X2, the relay electrode CE2 which is in contact with the data signal line Sb and the relay electrode ce1 which is in contact with the relay wiring RB are connected via an electroconductive spacer SP2 which passes through a liquid crystal layer LCR, and with the inter-substrate connection portion X3, the relay electrode CE3 which is in contact with the data signal line Sb and the relay electrode ce3 which is in contact with the relay wiring RB are connected via an electroconductive spacer SP3 which passes through the liquid crystal layer LCR.

Figure 5:
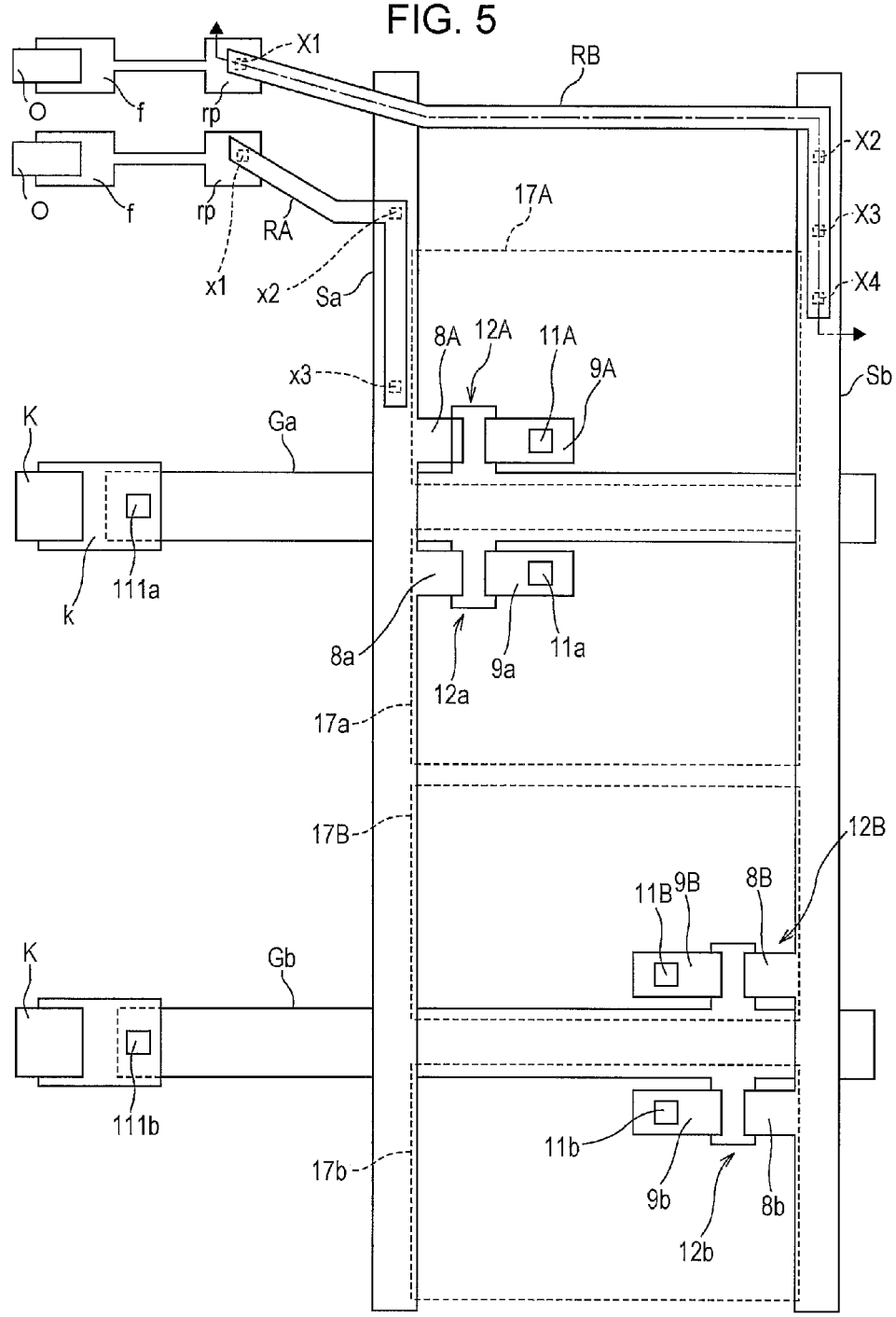
FIG. 5 is a plan view illustrating a modification of FIG. 2.

Note that, in FIGS. 2 and 3, the inter-substrate connection portion X2 for resistance value suppression is provided regarding the relay wiring RB, and the inter-substrate connection portion X2 for resistance value suppression is also provided regarding the relay wiring RA, though not restricted to these. As illustrated in FIG. 5, an arrangement may also be made wherein when the relay wiring RB is longer than the relay wiring RA, while providing two inter-substrate connection portions (X2 and X3) for resistance value suppression regarding the relay wiring RB, and one inter-substrate connection portion (X2) for resistance value suppression is provided regarding the relay wiring RA.

The liquid crystal panel LCP has a so-called vertical dividing double source structure (structure wherein four data signal lines are provided per one pixel column, four scanning signal lines can be selected at the same time) wherein two data signal lines are provided in response to an upper half of one pixel column (first region, upstream side of the panel), and also two data signal lines are provided in response to a lower half of this pixel column (second region, downstream side of the panel), and can perform 4× driving. Further, the liquid crystal panel LCP employs a so-called multi-pixel format where at least two pixel electrodes are included in one pixel, and can improve a view angle property using a bright region and a dark region formed within one pixel.

Figure 6:
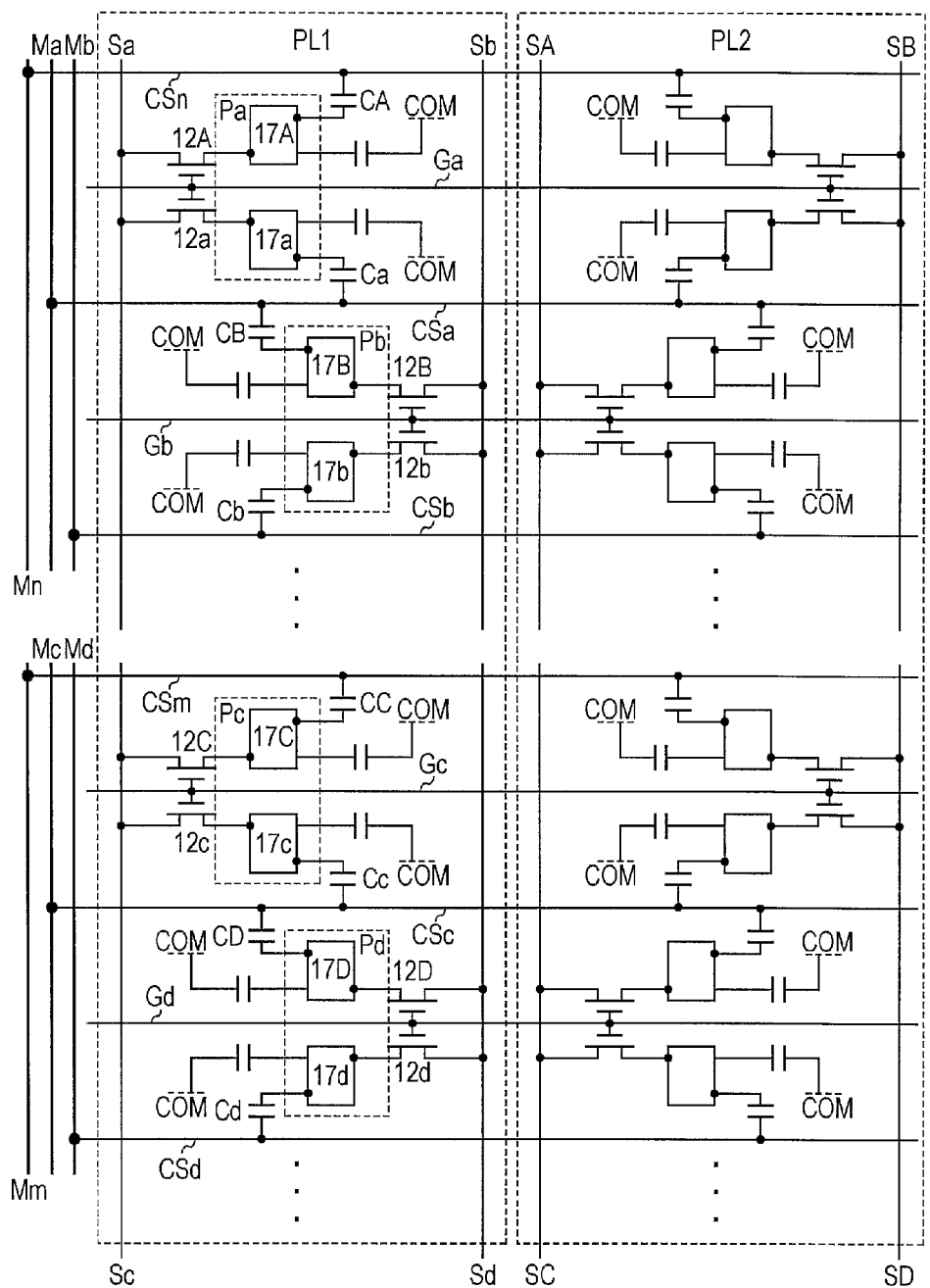
FIG. 6 is a circuit diagram illustrating a portion of the liquid crystal panel in FIG. 1.
Figure 7:
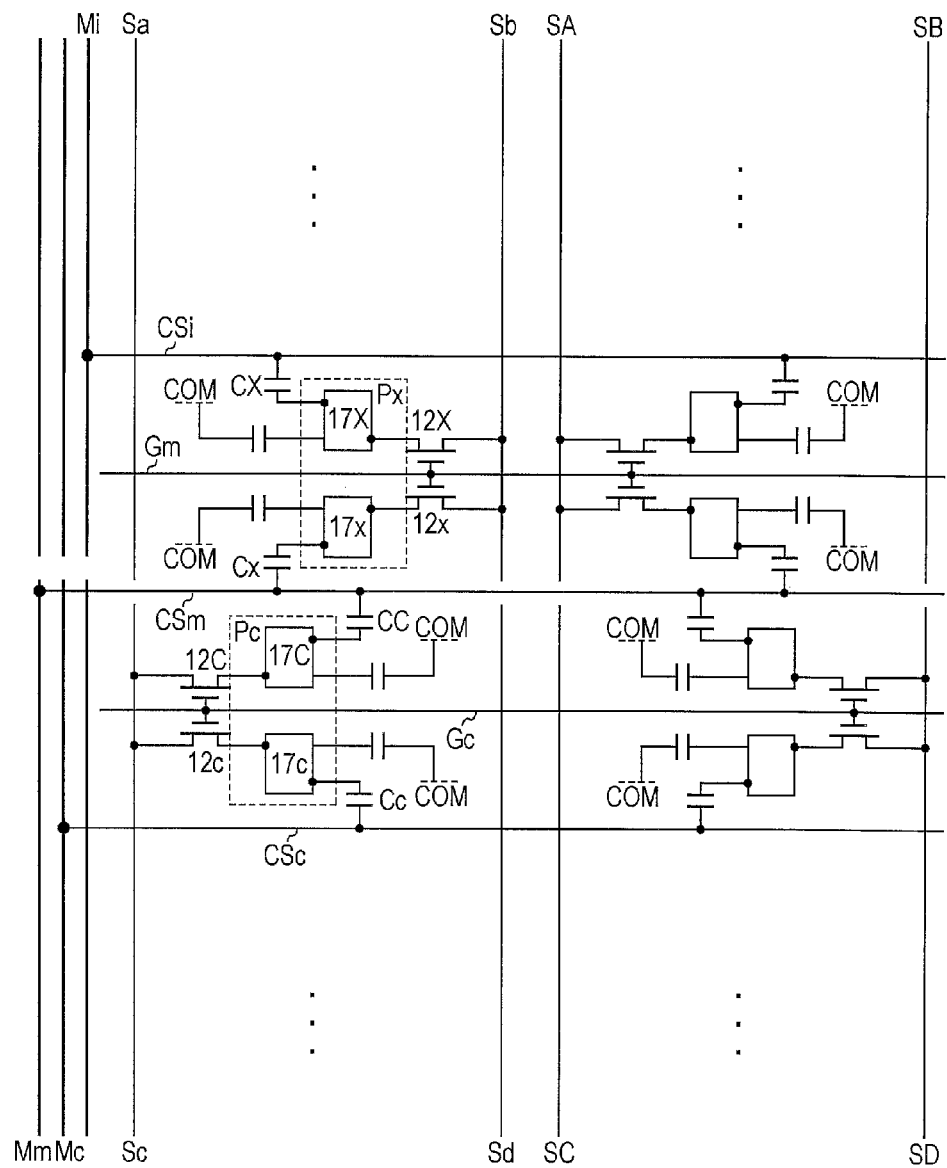
FIG. 7 is a circuit diagram illustrating a central portion of the liquid crystal panel in FIG. 1.

For example, as illustrated in FIGS. 4, 6, and 7, the scanning signal lines Ga and Gb, and the holding capacity wirings CSa and CSb are provided to an upper half (upstream side) of the panel, and also, the scanning signal lines Gc and Gd, and the holding capacity wirings CSc and CSd are provided to a lower half (downstream side) of the panel, two pixels Pa and Pb which are adjacent to each other in the column direction are included in an upper half (upstream side) of one pixel column PL1, and also, two pixels Pc and Pd which are adjacent to each other in the column direction are included in a lower half (downstream side) of the pixel column PL1, the data signal lines Sa and Sb are provided in response to an upper half (upstream side) of the pixel column PL1 are provided, and also, the data signal lines Sc and Sd are provided in response to a lower half (downstream side) of the pixel column PL1 are provided.

A TFT 12A connected to a pixel electrode 17A of two pixel electrodes 17A and 17a included in the pixel Pa, and a TFT 12a connected to the pixel electrode 17a are connected to the data signal line Sa and scanning signal line Ga respectively, the pixel electrode 17A makes up a holding capacity CA along with a holding capacity wiring CSn, and the pixel electrode 17a makes up a holding capacity Ca along with a holding capacity wiring CSa. Further, a TFT 12B connected to a pixel electrode 17B of two pixel electrodes 17B and 17b included in the pixel Pb, and the TFT 12b connected to the pixel electrode 17b are connected to the data signal line Sb and scanning signal line Gb respectively, the pixel electrode 17B makes up a holding capacity CB along with a holding capacity wiring CSa, and the pixel electrode 17b makes up a holding capacity Cb along with a holding capacity wiring CSb. Further, a TFT 12C connected to a pixel electrode 17C of two pixel electrodes 17C and 17c included in the pixel Pc, and a TFT 12c connected to the pixel electrode 17c are connected to the data signal line Sc and scanning signal line Gc respectively, the pixel electrode 17C makes up a holding capacity CC along with a holding capacity wiring CSm, the pixel electrode 17c makes up a holding capacity Cc along with a holding capacity wiring CSc. Further, a TFT 12D connected to a pixel electrode 17D of two pixel electrodes 17D and 17d included in the pixel Pd, and a TFT 12d connected to the pixel electrode 17d are connected to the data signal line Sd and scanning signal line Gd respectively, the pixel electrode 17D makes up a holding capacity CD along with a holding capacity wiring CSc, and the pixel electrode 17d makes up a holding capacity Cd along with a holding capacity wiring CSd. The four scanning signal lines Ga to Gd are simultaneously selected.

Note that, with the pixel column PL1, the data signal lines Sa and Sc are arrayed in the column direction at the left edge, and also, the data signal lines Sb and Sd are arrayed in the column direction at the right edge, and with a pixel column PL2 adjacent to the pixel column PL1, the data signal lines SA and SC are arrayed in the column direction at the left edge, and also, the data signal lines SB and SD are arrayed in the column direction at the right edge.

With the pixel column PL2, two pixel electrodes included in a pixel adjacent to the pixel electrode Pa are connected to the data signal line SB via a different TFT, two pixel electrodes included in a pixel adjacent to the pixel electrode Pb are connected to the data signal line SA via a different TFT, two pixel electrodes included in a pixel adjacent to the pixel electrode Pc are connected to the data signal line SD via a different TFT, and two pixel electrodes included in a pixel adjacent to the pixel electrode Pd are connected to the data signal line SC via a different TFT.

A configuration in the vicinity of a border of an upper half (first region) and a lower half (second region) is as in FIG. 7. Specifically, a TFT 12X connected to a pixel electrode 17X of two pixel electrodes 17X and 17X included in a pixel Px positioned in the bottom of the first region, and a TFT 12X connected to the pixel electrode 17X are connected to the data signal line Sb and scanning signal line Gm, the pixel electrode 17X makes up a holding capacity along with a holding capacity wiring CSi, the pixel electrode 17X makes up a holding capacity along with a holding capacity wiring CSm, and the pixel Pc is positioned in the top of the second region.

Note that the number of data signal lines provided to an upper half of the panel is at least 7680 (pixels)×3 (primary colors)×2 (double sources)=46080 lines, the number of scanning signal lines provided to an upper half of the panel is at least 2160 lines, the number of holding capacity wirings provided to an upper half of the panel is at least 2160 wirings, the number of data signal lines provided to a lower half of the panel is at least 46080 lines, the number of scanning signal lines provided to a lower half of the panel is at least 2160 lines, and the number of holding capacity wirings provided to a lower half of the panel is at least 2160 wirings.

A CS trunk wiring Ma (first trunk wiring) and a CS trunk wiring Mb are provided in the proximity of one of two short sides included in an upper half of the active matrix substrate, and are driven by the CS driver CD1 so that each has a different phase. A CS trunk wiring Mc (third trunk wiring) and a CS trunk wiring Md are provided in the proximity of the other of the two short sides included in an upper half of the active matrix substrate, and are driven by the CS driver CD2 so that each has a different phase. A CS trunk wiring Me and a CS trunk wiring Mf (second trunk wiring) are provided in the proximity of one of two short sides included in a lower half of the active matrix substrate, and are driven by the CS driver CD3 so that each has a different phase. A CS trunk wiring Mg and a CS trunk wiring Mh (fourth trunk wiring) are provided in the proximity of the other of the two short sides included in a lower half of the active matrix substrate, and are driven by the CS driver CD4 so that each has a different phase. One holding capacity wiring is connected to two CS trunk wirings disposed on both sides thereof, and a modulating (pulse) signal having the same phase is supplied to this one holding capacity wiring from these two CS trunk wirings. Thus, irregularities of signal deterioration due to CR (time constant) of a holding capacity wiring (change in degree of signal deterioration depending on position in the row direction) can be suppressed.

For example, the holding capacity wiring CSa is connected to the CS trunk wirings Ma and Mc, the holding capacity wiring CSb is connected to the CS trunk wirings Mb and Md, the holding capacity wiring CSc is connected to the CS trunk wirings Me and Mg, and the holding capacity wiring CSd is connected to the CS trunk wirings Mf and Mh. Accordingly, for example, when controlling the potentials of the CS trunk wirings Ma and Mb so as to have an opposite phase, the potentials of the holding capacity wirings CSa and CSb also have an opposite phase, and with the pixel Pb, the pixel electrode 17B of the two pixel electrodes 17B and 17*b* makes up capacity along with the holding capacity wiring CSa, and the pixel electrode 17*b* makes up capacity along with the holding capacity wiring CSb, and accordingly, after writing the same signal potential to the pixel electrodes 17B and 17*b*, for example, while shifting the effective potential of the pixel electrode 17B in a direction approximating to center potential, the effective potential of the pixel electrode 17*b* can be shifted in a direction separating from center potential (thus, a dark region corresponding to the pixel electrode 17B and a bright region corresponding to the pixel electrode 17*b* can be formed within one pixel).

Note that the polarity of a data signal to be supplied to one data signal line is inverted for each vertical scanning period (1V), and with the same vertical scanning period, the polarities of data signals to be supplied to one and the other of two data signal lines provided in response to one pixel column have a reversed polarity. Thus, while inverting each data signal line for 1V (i.e., while lengthening a polarity reversal cycle to reduce power consumption), a pixel polarity distribution within the screen can be subjected to dot inversion (thus, flickering due to lead-in voltage caused when a TFT is turned off can be suppressed).

Figure 8:
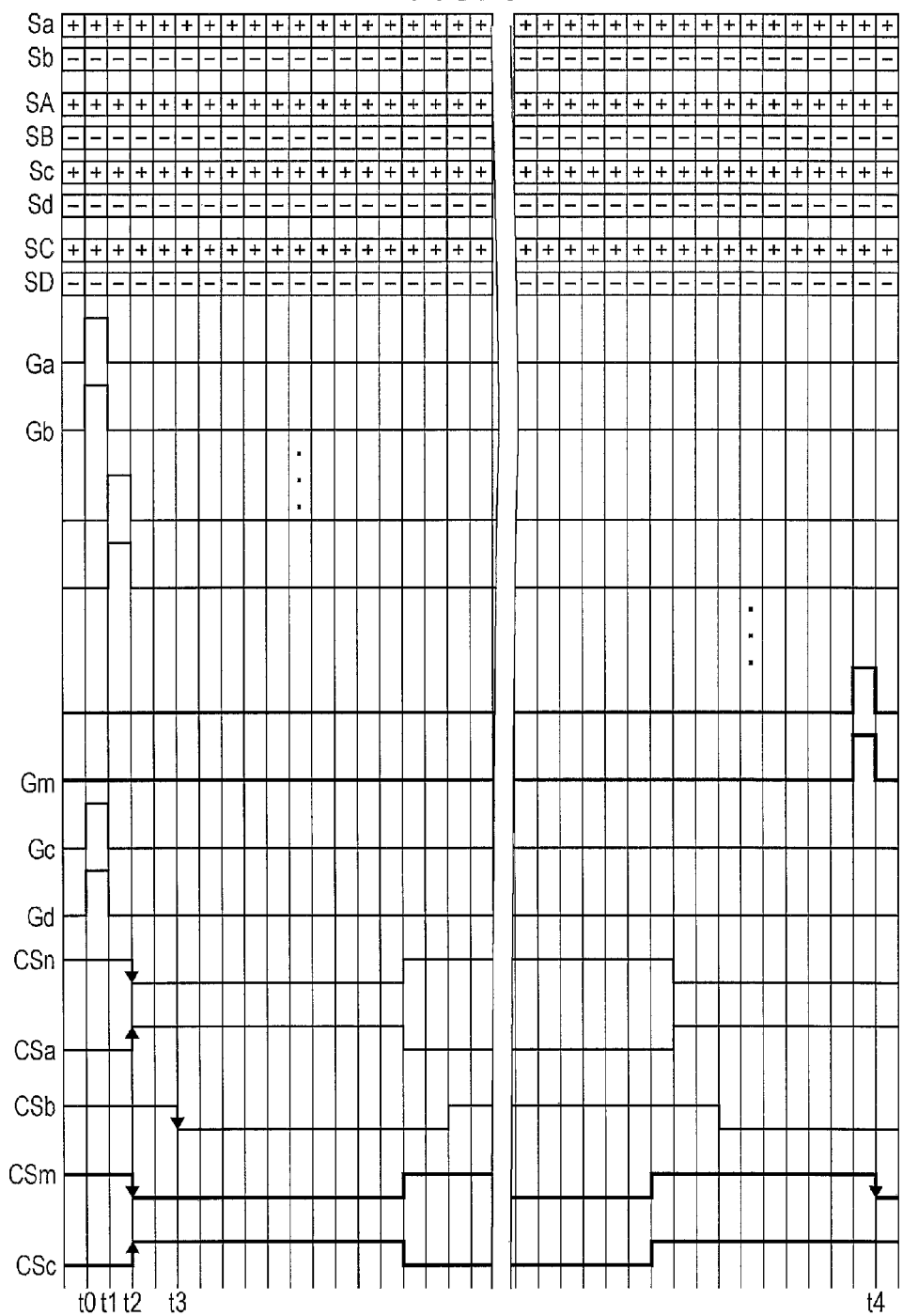
FIG. 8 is a timing chart representing a driving method of the liquid crystal panel in FIGS. 6 and 7.
Figure 9:
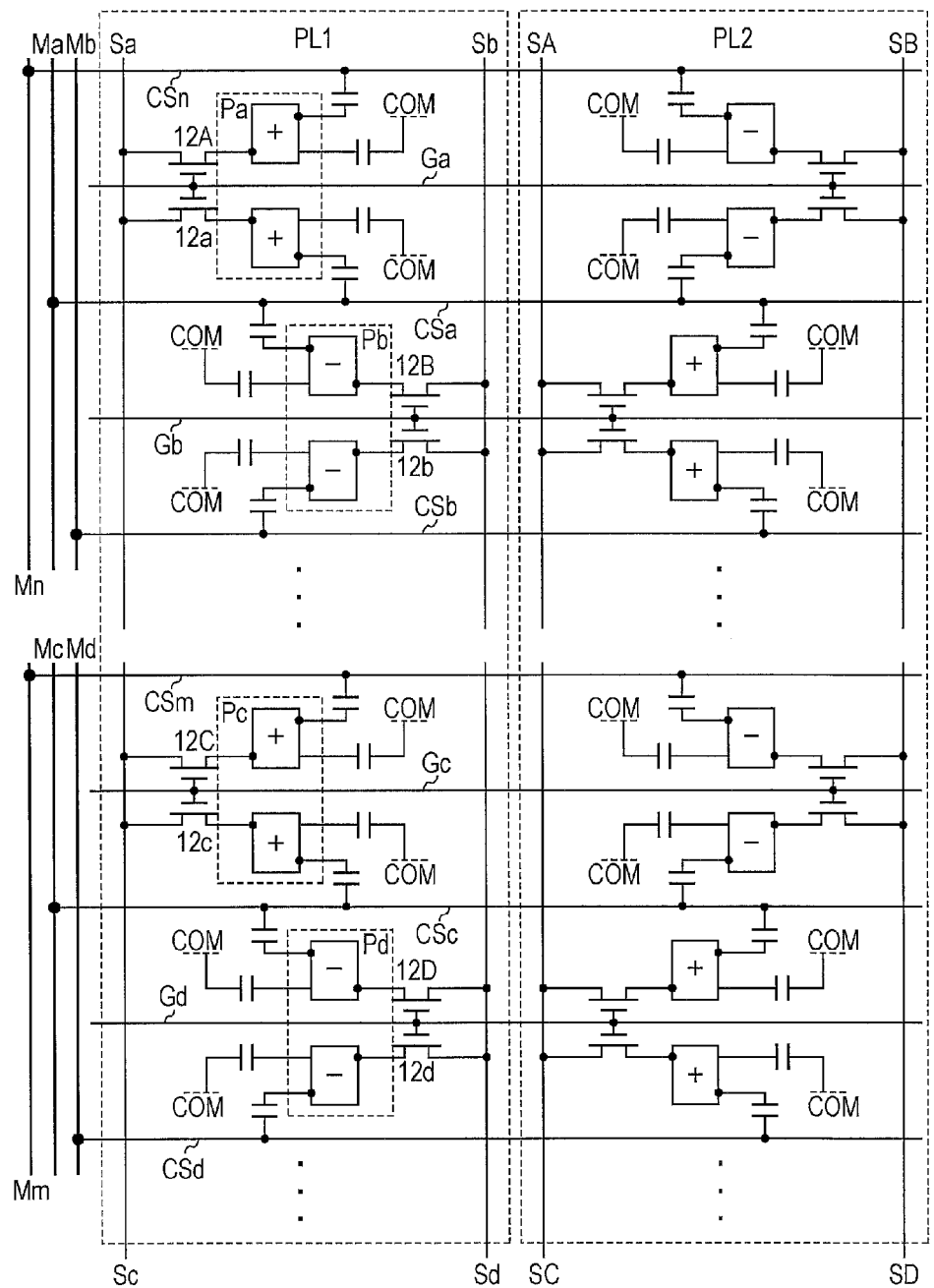
FIG. 9 is a circuit diagram illustrating a pixel polarity distribution (a portion in FIG. 6) according to the driving method in FIG. 8.
Figure 10:
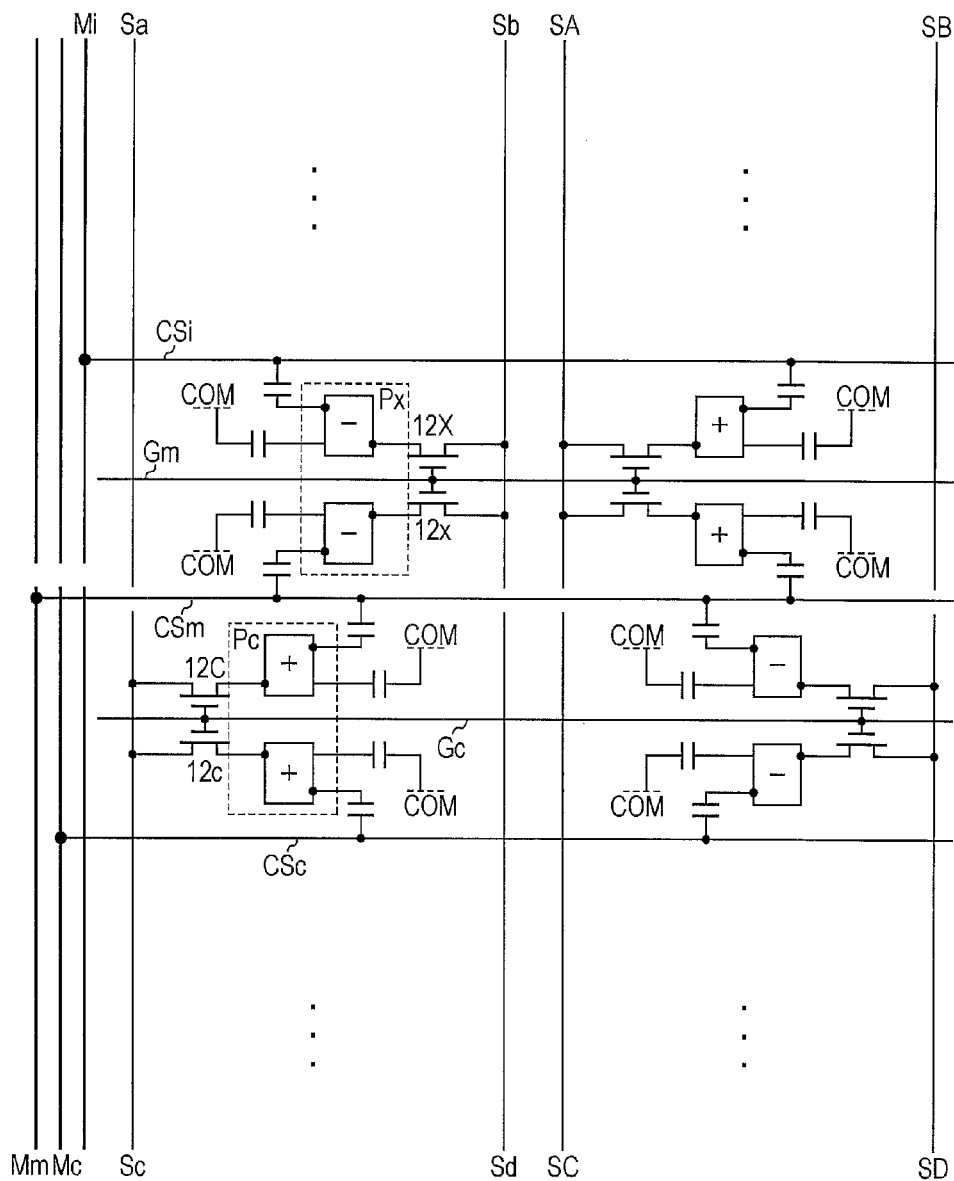
FIG. 10 is a circuit diagram illustrating a pixel polarity distribution (a portion in FIG. 7) according to the driving method in FIG. 8.
Figure 11:
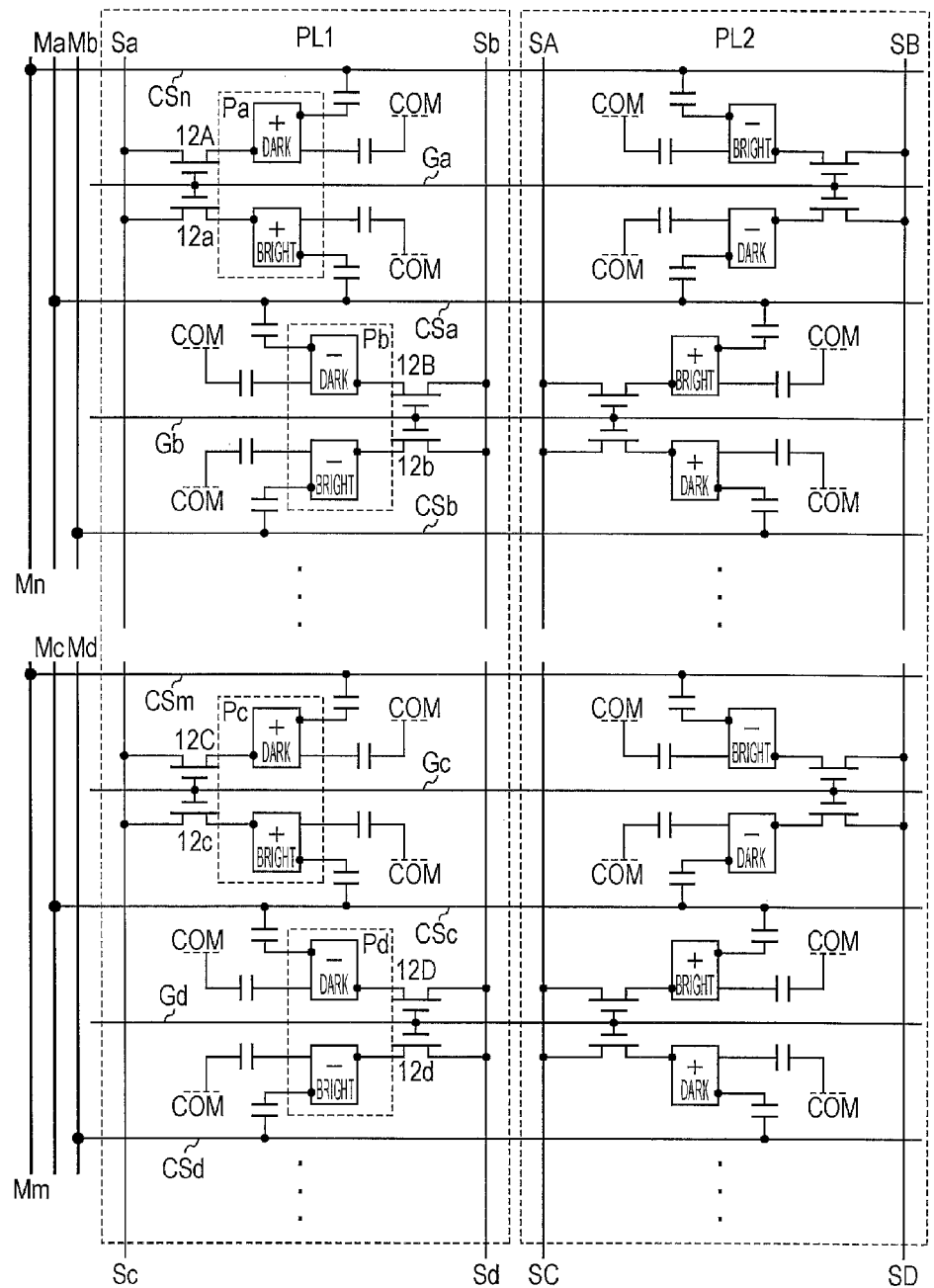
FIG. 11 is a circuit diagram illustrating a bright/dark region distribution (a portion in FIG. 6) according to the driving method in FIG. 8.
Figure 12:
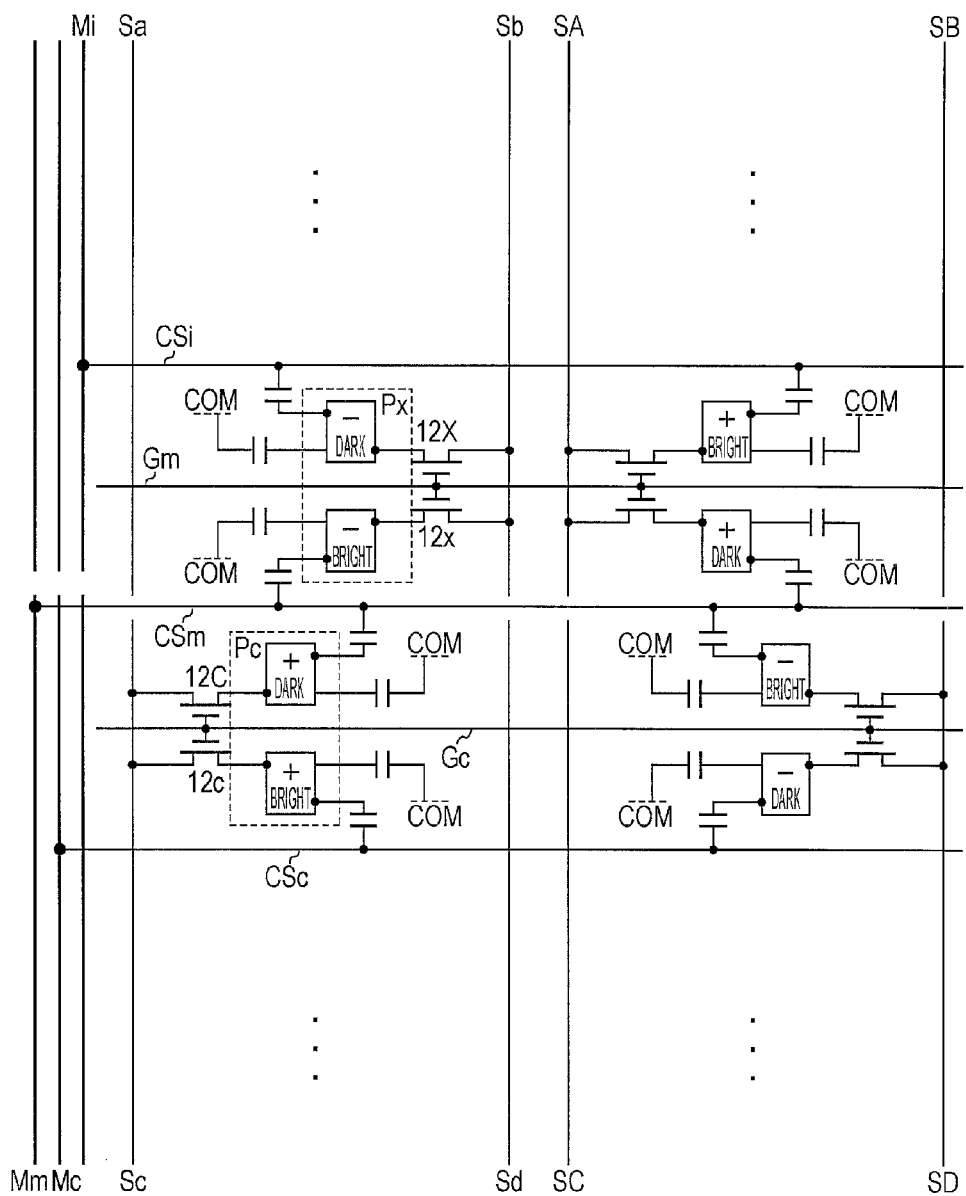
FIG. 12 is a circuit diagram illustrating a bright/dark region distribution (a portion in FIG. 7) according to the driving method in FIG. 8.

A driving method for portions illustrated in FIGS. 6 and 7 of the liquid crystal panel will be illustrated with a timing chart in FIG. 8 and schematic views in FIG. 9 to FIG. 12. Note that, as illustrated in FIG. 8, a positive data signal potential is supplied to the data signal lines Sa, SA, Sc, and SC during one vertical scanning period, and a negative data signal potential is supplied to the data signal lines Sb, SB, Sd, and SD during one vertical scanning period.

At point-in-time t0, simultaneous scanning of the scanning signal lines Ga and Gb is started, and at point-in-time t1 after 1H (vertical scanning period) from the t0, the simultaneous scanning of the scanning signal lines Ga and Gb is ended. Thus, a positive data signal potential is written in the pixel electrodes 17A and 17*a*, a positive data signal potential is written in the pixel electrodes 17C and 17*c*, and a negative data signal potential is written in the pixel electrodes 17D and 17*d*.

At t2 after 1H from the t1, according to a modulating signal transmitted from the CS trunk line Mn, the potential of the holding capacity wiring CSn is shifted to a L (Low) side, and along therewith, the potential of the pixel electrode 17A drops, and an effective potential until the next scanning is lower than the written data signal potential (+) (goes into a dark region). Also, at the t2, the potential of the holding capacity wiring CSa is shifted to an H (High) side by the modulating signal transmitted from the CS drivers CD1 and CD2 via the CS trunk wirings Ma and Mc, and along therewith, the potential of the pixel electrode 17*a* spikes, and an effective potential until the next scanning rises above the written data signal potential (+) (goes into a bright region). Also, at the t2, (since the holding capacity wiring CSa shifts to the H side) the potential of the pixel electrode 17B spikes, and an effective potential until the next scanning rises above the written data signal potential (−) (goes into a dark region).

Further, at the t2, according to a modulating signal transmitted from the CS trunk line Mm, the potential of the holding capacity wiring CSm is shifted to a L (Low) side, and along therewith, the potential of the pixel electrode 17C drops, and an effective potential until the next scanning is lower than the written data signal potential (+) (goes into a dark region). Also, at the t2, the potential of the holding capacity wiring CSc is shifted to an H (High) side by the modulating signal transmitted from the CS drivers CD3 and CD4 via the CS trunk wirings Me and Mg, and along therewith, the potential of the pixel electrode 17*c* spikes, and an effective potential until the next scanning rises above the written data signal potential (+) (goes into a bright region).

At t3 after 2H from the t2, according to a modulating signal transmitted from the CS drivers CD1 and CD2 via the CS trunk wirings Mb and Md, the potential of the holding capacity wiring CSb is shifted to the L side, and along therewith, the potential of the pixel electrode 17*b* drops, and an effective potential until the next scanning is lower than the written data signal potential (−) (goes into a bright region).

When scanning of the pixel Px positioned in the bottom of the first region is ended at point-in-time t4, a negative data signal potential is written in the pixel electrodes 17X and 17*x*. Further, at the t4, according to a modulating signal transmitted from the CS trunk line Mm, the potential of the holding capacity wiring CSm is shifted to the L (Low) side, and accordingly, the potential of the pixel electrode 17*x* drops, and an effective potential until the next scanning is lower than the written data signal potential (−) (goes into a bright region).

Note that, with regarding to four scanning signal lines Ga to Gd to be selected at the same time, when assuming that the scanning signal line Ga is the n'th line as counted from the long side on the upper side of the panel, and the scanning signal line Gb is the n+1'th line (described as n=0 in FIG. 4, and FIG. 6 to FIG. 12), the scanning signal line Gc is the n+2160'th line as counted from this long side on the upper side, and the scanning signal line Gb is the n+2161'th line, and when assuming that data signals in the n'th line of the N'th frame are written in the scanning signal line Ga provided to an upper half of the panel, data signals in the n+2160'th line of the N−1'th frame which is one ahead frame are written in the scanning signal line Gc provided to a lower half of the panel. Thus, the sensation of an offset between the top and bottom of the panel is suppressed.

The backlight controller BLC receives a video signal QBL output from the pixel mapping circuit PMC, outputs a backlight control signal to the backlight driver BD, and the backlight BL is driven by the backlight driver BD. Note that the backlight BL is divided into multiple, and each thereof is individually subjected to bright adjustment (active backlight) according to the video signal QBL.

The power supply controller monitors a supply power level of commercial power supply to be connected to each of the three power supply circuits, and in the event that abnormality (deterioration in the supply power level) has occurred on one or multiple commercial power sources for some reason, a power supply line to the backlight BL (e.g., three systems for R, G, and B) and a power supply line to the display control substrates DC1 to DC4 (e.g., one system) are switched to one or multiple normal commercial power sources, and also, an abnormality occurrence signal is output to the backlight controller BLC. The backlight controller BLC which has received this abnormality occurrence signal outputs a control signal, such as reducing the upper limit of brightness of the backlight BL, to the backlight driver BD. Thus, damage and so forth of the display control substrates DC1 to DC4 due to unexpected abnormality of a commercial power source can be prevented.

Note that, in the event that three power supply circuits have not been needed according to power saving or the like of the liquid crystal display device, or in the event that a configuration is available wherein only one power supply circuit to be connected to a commercial power source is provided, the power supply controller may monitor the supply power level of this one commercial power source, and in the event that abnormality (deterioration in the supply power level) has occurred on this commercial power source for some reason, outputs an abnormality occurrence signal to the backlight controller BLC (the backlight controller BLC which has received this abnormality occurrence signal outputs a control signal, such as reducing the upper limit of brightness of the backlight BL, to the backlight driver BD).

Second Embodiment

Figure 13:
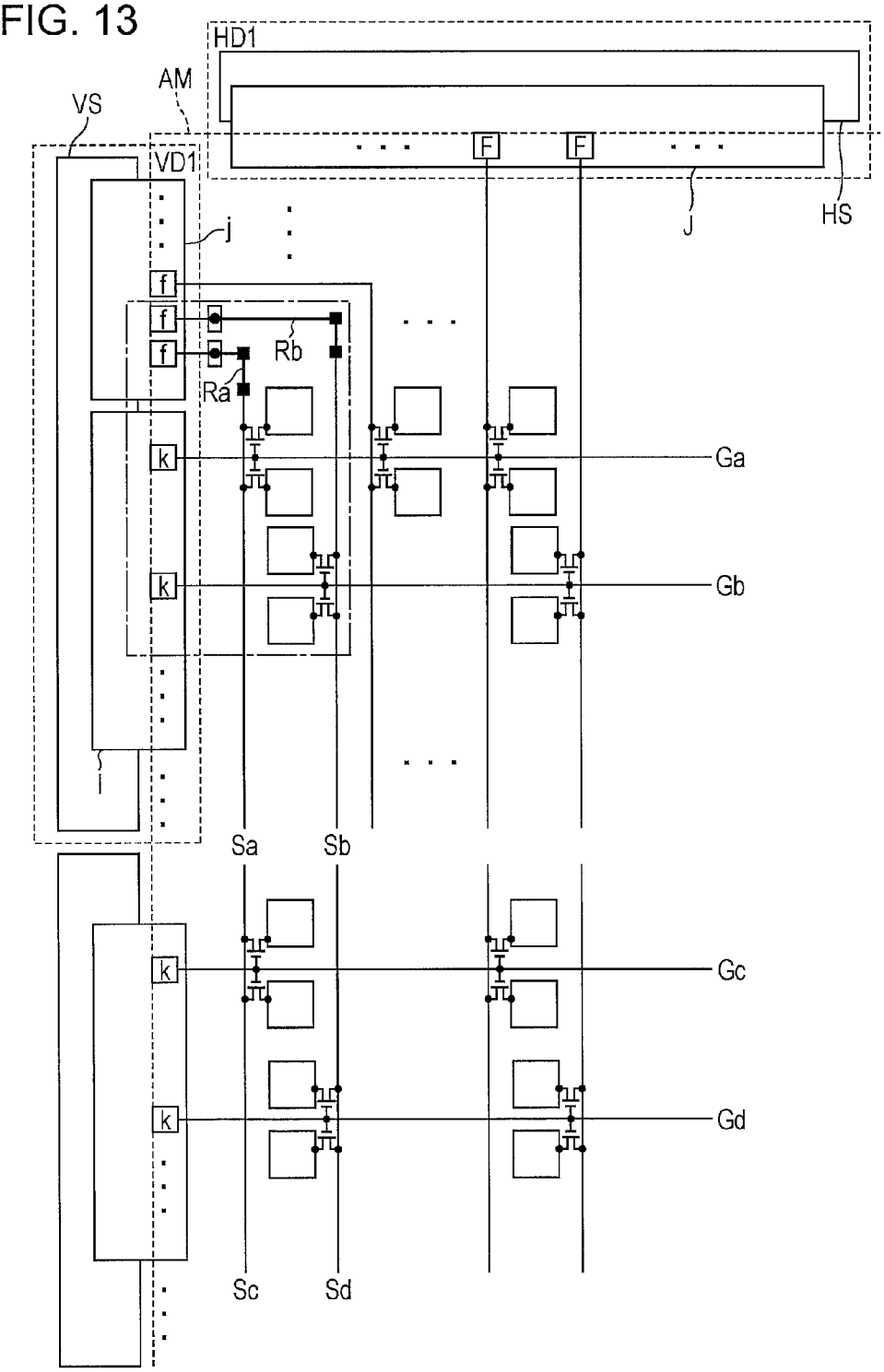
FIG. 13 is a schematic view illustrating a partial configuration of a liquid crystal panel according to a second embodiment.

With the first embodiment, the relay wiring RB has been provided to the counter substrate, though not restricted to this. For example, as illustrated in FIG. 13, and FIG. 14 which is a plan view of a portion surrounded with a dashed line in FIG. 13, relay wirings Rb and Ra may also be provided to a gate layer (a layer for forming scanning signal lines and holding capacity wirings) of the active matrix substrate.

Figure 14:
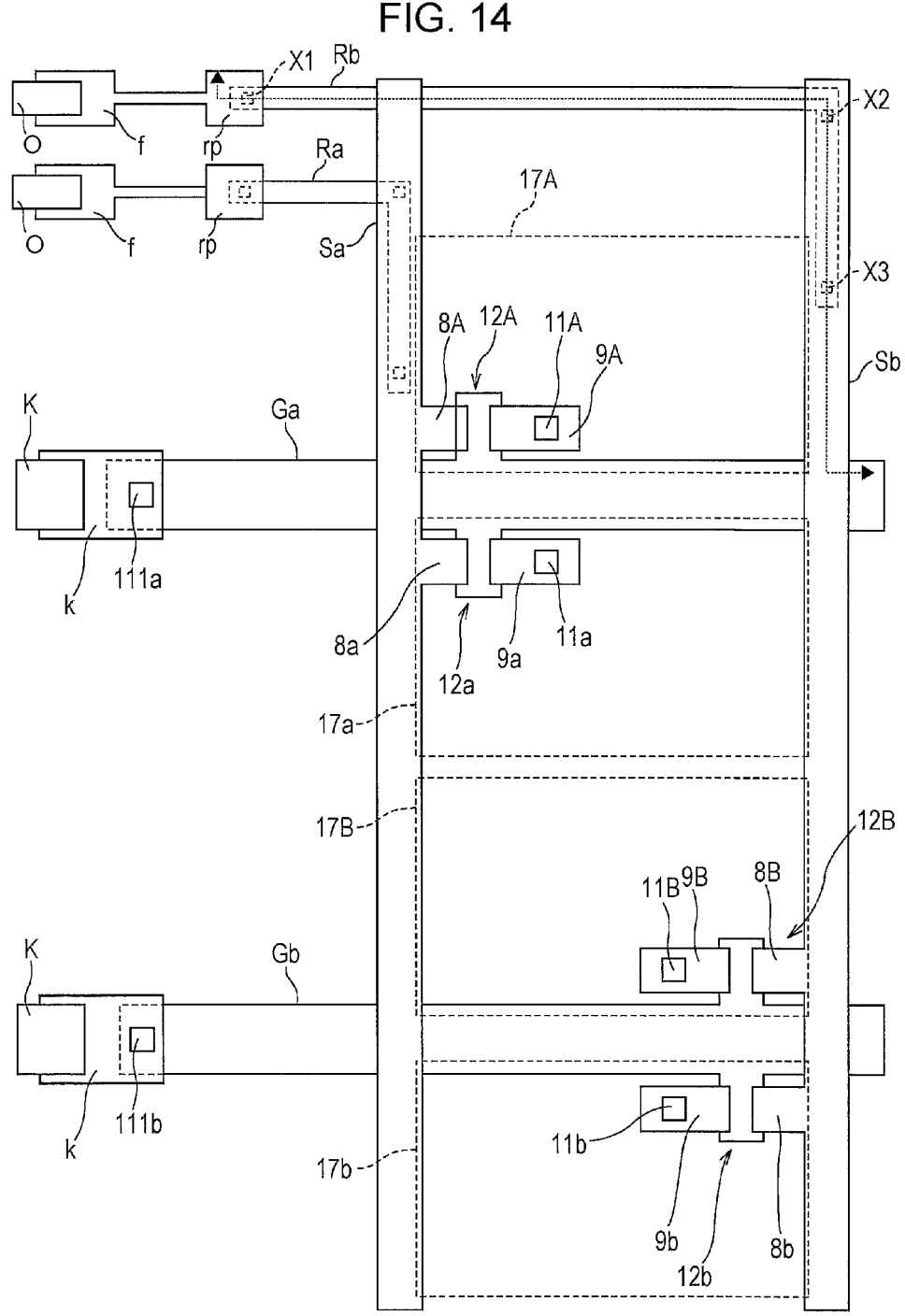
FIG. 14 is a plan view illustrating a configuration surrounded with a dashed line in FIG. 13.
Figure 15:
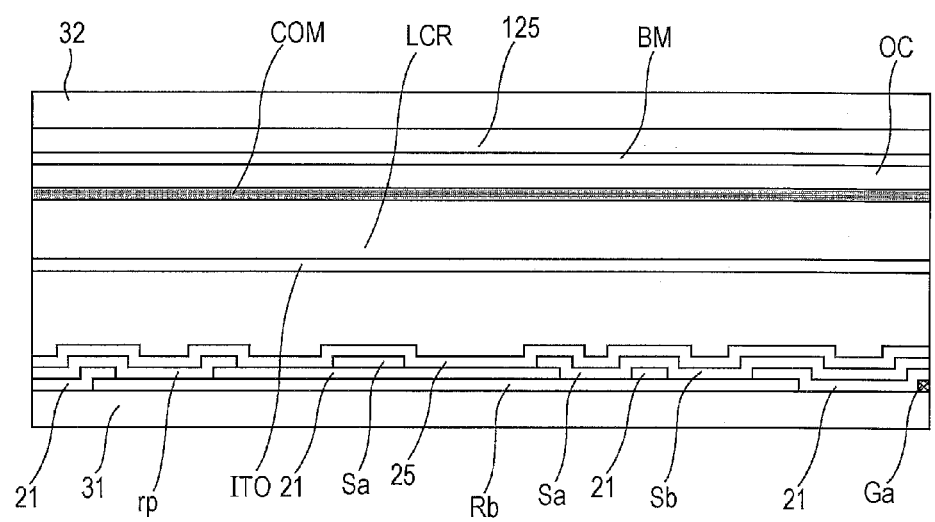
FIG. 15 is a cross-sectional view taken along the arrow in FIG. 14.

FIG. 15 illustrates a cross-sectional view of the inter-substrate connection portions X1 to X3 in FIG. 14. As illustrated in FIG. 15, with the active matrix substrate, the scanning signal line Ga and relay wiring Rb are formed on the glass substrate 31, the gate insulating film 21 is formed on the scanning signal line Ga, the data signal lines Sa and Sb and relay pad rp are formed on the gate insulating film 21, an inorganic inter-layer insulating film 25 and an organic inter-layer insulating film 26 are laminated on an upper layer of these, and a transparent electrode formed in the same process as with each pixel electrode (e.g., ITO) is formed on the organic inter-layer insulating film 26.

With the inter-substrate connection portion X1, the relay wiring Rb and relay pad rp are connected via a contact hole which passes through the gate insulating film 21, and with the inter-substrate connection portions X2 an X3, the relay wiring Rb and data signal line Sb are connected via a contact hole which passes through the gate insulating film 21.

Third Embodiment

Figure 16:
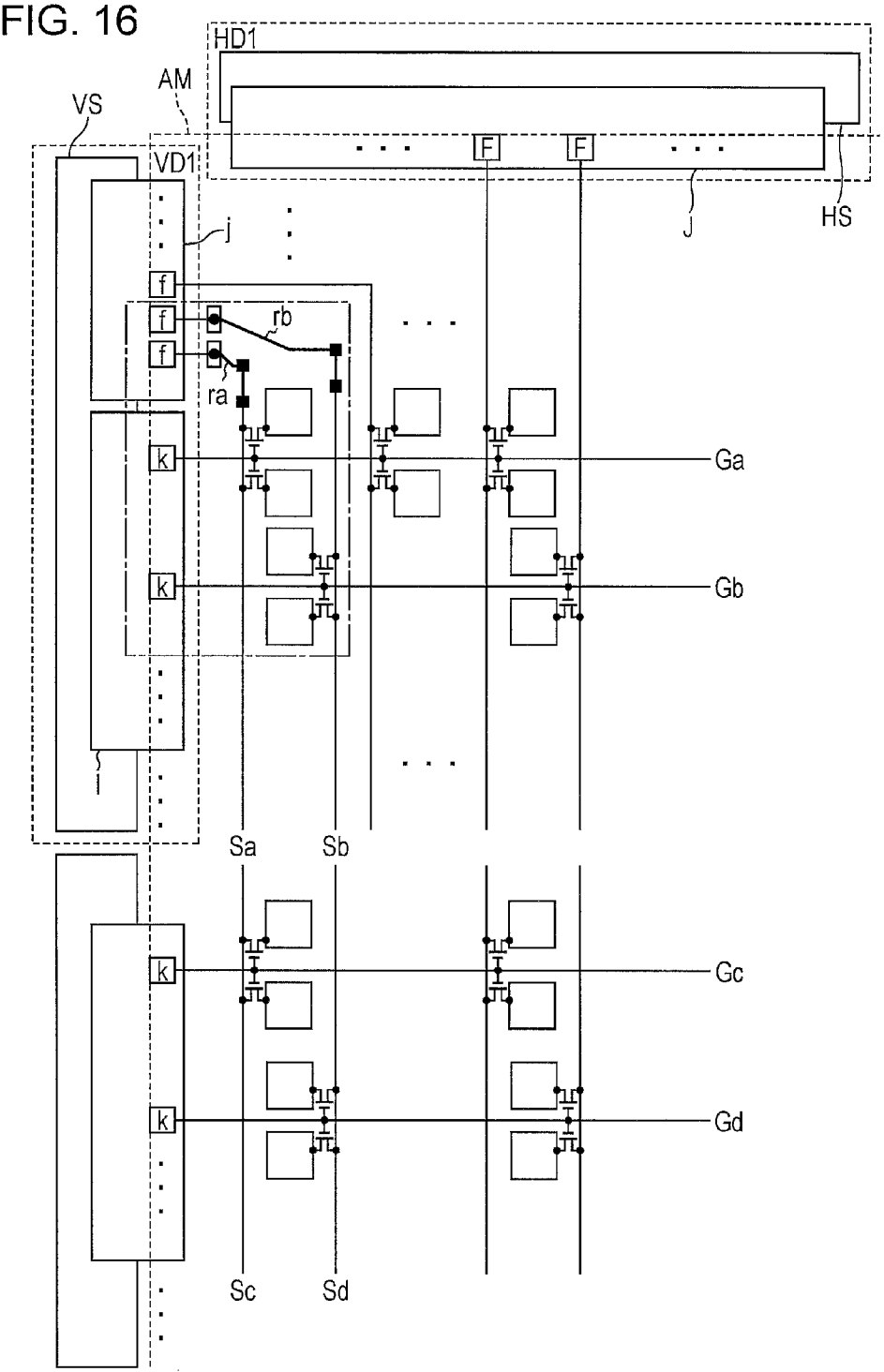
FIG. 16 is a schematic view illustrating a configuration of a liquid crystal panel according to a third embodiment.

The relay wiring RB has been provided to the gate layer of the active matrix substrate, though not restricted to this. For example, as illustrated in FIG. 16, and FIG. 17 which is a plan view of a portion surrounded with a dashed line in FIG. 16, relay wirings rb and ra may also be provided onto the inorganic inter-layer insulating film 25 of the active matrix substrate (between the layer of data signal lines and the layer where pixel electrodes are formed).

Figure 17:
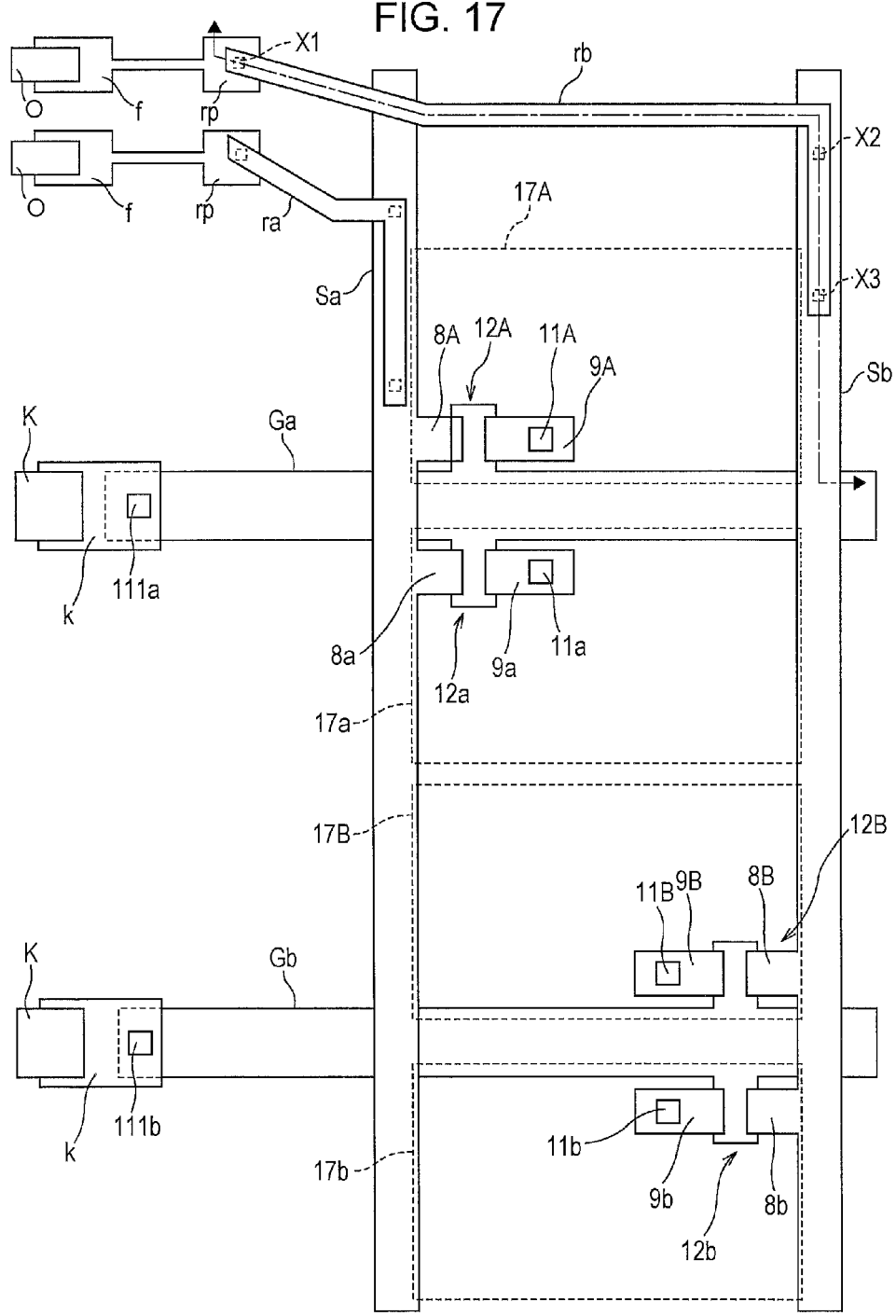
FIG. 17 is a plan view illustrating a configuration surrounded with a dashed line in FIG. 16.
Figure 18:
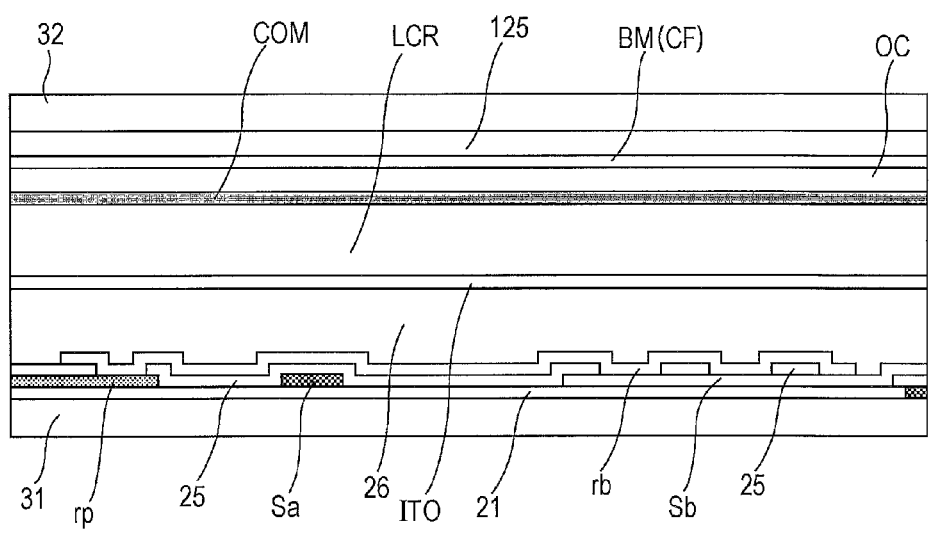
FIG. 18 is a cross-sectional view taken along the arrow in FIG. 17.

FIG. 18 illustrates a cross-sectional view of the inter-substrate connection portions X1 to X3 in FIG. 17. As illustrated in FIG. 18, with the active matrix substrate, the scanning signal line Ga is formed on the glass substrate 31, the gate insulating film 21 is formed on the scanning signal line Ga, the data signal lines Sa and Sb and relay pad rp are formed on the gate insulating film 21, an inorganic inter-layer insulating film 25 is formed on an upper layer of these, the relay wiring rb is formed on the inorganic inter-layer insulating film 25, an organic inter-layer insulating film 26 is formed on the relay wiring rb, and a transparent electrode formed in the same process as with each pixel electrode (e.g., ITO) is formed on the organic inter-layer insulating film 26.

With the inter-substrate connection portion X1, the relay wiring Rb and relay pad rp are connected via a contact hole which passes through the inorganic inter-layer insulating film 25, and with the inter-substrate connection portions X2 and X3, the relay wiring Rb and data signal line Sb are connected via a contact hole which passes through the inorganic inter-layer insulating film 25.

As described above, the present liquid crystal panel is a liquid crystal panel including: an array substrate (active matrix substrate) including a pixel electrode, a transistor, and first and second data signal lines; and a counter substrate; with the array substrate including first and second sides which are adjacent to each other; with a first terminal having shorter distance from the first side than distance from the second side in a plan view, and a second terminal having shorter distance from the second side than distance from the first side in a plan view being formed in the array substrate; with the first data signal line being electrically connected to the first terminal; and with the second data signal line and the second terminal being electrically connected via a relay wiring formed in a layer different from the first and second data signal lines.

In this manner, a terminal (second terminal) is also formed on the second-side side, and this second terminal and the second data signal line are connected via a relay wiring of a layer different from the first and second data signal lines, thereby enabling the number of terminals for data signal lines to be increased without changing a substrate size.

With the present liquid crystal panel, the relay wiring may be provided to the counter substrate.

The present liquid crystal panel may include an electroconductive spacer electrically connected to the relay wiring between the array substrate and the counter substrate.

With the present liquid crystal panel, the relay wiring may be provided to the same layer as with a gate electrode of the transistor.

With the present liquid crystal panel, the relay wiring may be provided between a layer where the first and second data signal lines area formed and a layer where the pixel electrode is formed.

With the present liquid crystal panel, the first side may be longer than the second side.

The present invention is not restricted to the above embodiments, and modifications suitably modified from the above embodiments based on common general technical knowledge, and a combination obtained by combining these are also encompassed in embodiments of the present invention.

INDUSTRIAL APPLICABILITY

The present invention is suitable for liquid crystal display devices, for example.

REFERENCE SIGNS LIST

LCD liquid crystal display device
LCP liquid crystal panel
TC1 to TC8 timing controller
DC1 to DC4 display control substrate
Pa to Pd pixel
Ga to Gd scanning signal line
17a and 17A pixel electrode
17b and 17B pixel electrode
12a and 12A transistor
12b and 12B transistor
Sa to Sd data signal line
SA to SD data signal line
f long side source terminal
F short side source terminal
k gate terminal
RA and RB, Ra and Rb, ra and rb relay wiring
X1 to X3 inter-substrate connection portion
SP1 to SP3 electroconductive spacer

The invention claimed is:

1. A liquid crystal panel comprising:
an array substrate including
  a pixel electrode,
  a transistor, and
  first and second data signal lines; and
a counter substrate; wherein
the array substrate includes a first side orthogonal or substantially orthogonal to a direction in which the first and second data signal lines extend, and a second side parallel or substantially parallel to the direction in which the first and second data signal lines extend;
a first terminal is provided on the first side, and a second terminal is provided on a different side from the first side in the array substrate;
the first data signal line is electrically connected to the first terminal; and
the second data signal line is arranged closer to the different side than the first side, and the second data signal line is electrically connected to the second terminal via a relay wiring provided in a layer different from a layer in which the first and second data signal lines are provided.

2. The liquid crystal panel according to claim 1, wherein the relay wiring is provided to the counter substrate.

3. The liquid crystal panel according to claim 1, further comprising:
an electroconductive spacer electrically connected to the relay wiring between the array substrate and the counter substrate.

4. The liquid crystal panel according to claim 1, wherein the relay wiring is provided to the same layer as with a gate electrode of the transistor.

5. The liquid crystal panel according to claim 1, wherein the relay wiring is provided between a layer where the first and second data signal lines area formed and a layer where the pixel electrode is formed.

6. The liquid crystal panel according to claim 1, wherein the first side is longer than the second side.

7. A liquid crystal display device comprising:
the liquid crystal panel according to claim 1.

8. The liquid crystal panel according to claim 1, wherein the second terminal is provided on the second side.

9. The liquid crystal panel according to claim 1, wherein there are two or more of the relay wirings, and one of the second data signal lines is provided for two of the two or more relay wirings.

* * * * *